United States Patent
Koskinen et al.

(10) Patent No.: US 11,554,932 B2
(45) Date of Patent: Jan. 17, 2023

(54) METHOD AND ELEVATOR

(71) Applicant: KONE Corporation, Helsinki (FI)

(72) Inventors: Antti Koskinen, Helsinki (FI); Mikko Puranen, Helsinki (FI); Serguei Laitinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 799 days.

(21) Appl. No.: 16/566,617

(22) Filed: Sep. 10, 2019

(65) Prior Publication Data

US 2020/0002122 A1    Jan. 2, 2020

Related U.S. Application Data

(63) Continuation of application No. PCT/EP2018/059416, filed on Apr. 12, 2018.

(30) Foreign Application Priority Data

Apr. 12, 2017   (EP) ..................... 17166252

(51) Int. Cl.
   *B66B 1/32*   (2006.01)
   *B66B 1/36*   (2006.01)
   (Continued)

(52) U.S. Cl.
   CPC .................. *B66B 1/32* (2013.01); *B66B 1/36* (2013.01); *B66B 5/18* (2013.01); *B66B 9/00* (2013.01);
   (Continued)

(58) Field of Classification Search
   CPC .... B66B 1/36; B66B 1/32; B66B 5/18; B66B 1/44
   See application file for complete search history.

(56) References Cited

U.S. PATENT DOCUMENTS 6,193,026 B1 *  2/2001  Sevilleja ................ B60T 13/22
                                                188/153 R
8,157,061 B2 *  4/2012  Gremaud ................. B66B 5/16
                                                188/166
(Continued)

FOREIGN PATENT DOCUMENTS

DE   202015104095 U1 * 12/2016 ............ B66B 1/365
EP       1067084 A1 *  1/2001 ........ B66B 11/0293
(Continued)

OTHER PUBLICATIONS

International Search Report (PCT/ISA/210) issued in PCT/EP2018/059416, dated Jul. 17, 2018.
(Continued)

*Primary Examiner* — Diem M Tran
(74) *Attorney, Agent, or Firm* — Birch, Stewart, Kolasch & Birch, LLP (57) ABSTRACT

A method for controlling movement of an elevator car includes driving the car vertically to a landing; activating a park brake; and holding the car immovable with the park brake. The holding includes compressing a guide rail by compression members with a first compression force; opening a door for allowing loading and/or unloading the car; maintaining the door open for allowing loading and/or unloading the car while the car is held immovable; and starting closing movement of the door. After the starting closing movement of the door, relieving the brake for allowing the elevator car to start to move vertically. The relieving includes reducing the compression force of the brake, to be smaller than the first compression force, such that the compression members start sliding vertically against the guide rail; maintaining compression with a smaller compression force than the first compression force, allowing the compression members to continue to slide vertically
(Continued)

against the guide rail; and thereafter removing the compression.

20 Claims, 5 Drawing Sheets

(51) Int. Cl.
| | |
|---|---|
| *B66B 5/18* | (2006.01) |
| *B66B 9/00* | (2006.01) |
| *F16D 66/00* | (2006.01) |
| *F16H 15/20* | (2006.01) |
| *F16D 121/24* | (2012.01) |
| *F16D 125/40* | (2012.01) |

(52) U.S. Cl.
CPC ............. *F16D 66/00* (2013.01); *F16H 15/20* (2013.01); *F16D 2066/005* (2013.01); *F16D 2121/24* (2013.01); *F16D 2125/40* (2013.01)

(56) References Cited

U.S. PATENT DOCUMENTS

| | | | |
|---|---|---|---|
| 8,312,972 B2 | 11/2012 | Gremaud et al. | |
| 8,978,832 B2* | 3/2015 | Studer | B66B 5/18 187/359 |
| 8,991,561 B2 | 3/2015 | Husmann | |
| 10,358,320 B2 | 7/2019 | Bitzi et al. | |
| 10,737,905 B2* | 8/2020 | Bhosale | B66B 5/18 |
| 11,203,510 B2* | 12/2021 | Witczak | B66B 17/34 |
| 2008/0128218 A1* | 6/2008 | Gremaud | B66B 5/22 187/250 |
| 2011/0226560 A1* | 9/2011 | Husmann | F16D 65/28 188/67 |
| 2013/0213750 A1* | 8/2013 | Meierhans | F16D 65/00 188/264 B |
| 2013/0277152 A1* | 10/2013 | Fargo | B66D 5/30 187/359 |
| 2014/0008157 A1 | 1/2014 | Terry et al. | |
| 2015/0259175 A1* | 9/2015 | West | F16D 63/008 187/359 |
| 2016/0280511 A1* | 9/2016 | Anderson | B66B 1/32 |
| 2020/0039788 A1* | 2/2020 | Witczak | B66B 1/365 |
| 2021/0139275 A1* | 5/2021 | Koskinen | B66B 1/44 |
| 2021/0253396 A1* | 8/2021 | Billard | B66B 9/00 |

FOREIGN PATENT DOCUMENTS

| | | | |
|---|---|---|---|
| EP | 1 671 912 A1 | 6/2006 | |
| EP | 1862419 A1 * | 12/2007 | ............... B66B 5/16 |
| EP | 1 930 282 A1 | 6/2008 | |
| EP | 2 688 825 A1 | 1/2014 | |
| KR | 20210059380 A * | 11/2015 | |
| WO | WO 2015/191696 A1 | 12/2015 | |
| WO | WO 2016/045934 A1 | 3/2016 | |
| WO | WO-2021110413 A1 * | 6/2021 | ............... B66B 1/32 |

OTHER PUBLICATIONS

Written Opinion of the International Searching Authority (PCT/ISA/237) issued in PCT/EP2018/059416, dated Jul. 17, 2018.

* cited by examiner

METHOD AND ELEVATOR

CROSS REFERENCE TO RELATED APPLICATIONS

This application is a Continuation of PCT International Application No. PCT/EP2018/059416, filed on Apr. 12, 2018, which claims priority under 35 U.S.C. 119(a) to patent application Ser. No. 17/166,252.1, filed in European Patent Office on Apr. 12, 2017, all of which are hereby expressly incorporated by reference into the present application.

FIELD OF THE INVENTION

The invention relates to a method for controlling movement of an elevator car, in particular in context of parking of an elevator car immovably at a landing, as well as to an elevator implementing the method. The elevator is preferably an elevator for vertically transporting passengers and/or goods.

BACKGROUND OF THE INVENTION

In elevators, a suspension roping containing one or more suspension ropes is typically used as the means by which the elevator car is suspended. The suspension ropes are elastic at least to some degree. If not prevented, this elasticity has the potential of causing problematic car displacement during loading and unloading of the elevator car, because in these situations passengers enter and/or exit the car so that the rope tension changes. Tension changes cause elastic rope length changes as allowed by slight elasticity of the rope. Therefore, in a loading/unloading situation the car could be displaced vertically if not prevented. Especially, when the lifting height is great, the ropes are long and the possible displacement of an elevator car during loading may be substantial.

A park brake has been developed to keep the elevator car immovable during loading and to prevent the aforementioned problems caused by rope elasticity. Such solutions have been developed which comprises a brake to be mounted on the car and comprising compression members which are movable relative to each other for compressing a guide rail between them. In this kind of solutions, when the load situation is changed during parking through increase or decrease of number of passengers inside the car, it practically always means that the vertical forces pulling the car upwards and the vertical forces pulling the car downwards, namely gravity forces and rope tension force respectively, do not anymore counteract each other completely when the park brake is to be opened. For this reason, when the park brake is opened, the car drops or jumps because of the energy stored in the closed brakes is released quickly. This can be felt inside the car.

Earlier, a solution has been contemplated where the hoisting machinery is used to rotate the drive sheave of the elevator slightly in order to increase or decrease the rope tension so that the unbalance between rope tension and gravity is removed so as to keep the elevator car stationary when the park brake is released.

It has come up a need for an alternative solution for eliminating problems caused by tendency of the car to displace when the park brake is opened.

Moreover, the prior art solutions have not been very efficient in terms of one or more of control of back and forth movement of the compression members, control of compression force of the compression members, simplicity of the structure and compactness of the structure.

Related prior art has been disclosed in documents WO2015191696 A1, EP2688825 A1, U.S. Pat. No. 8,991, 561B2 and EP1930282B1, for instance.

BRIEF DESCRIPTION OF THE INVENTION

The object of the invention is to introduce a new method as well as a new elevator implementing the method, wherein one or more of the above defined problems of prior art and/or problems discussed or implied elsewhere in the description can be solved. Particularly, an object is to introduce a new method improved in terms of its ability to eliminate problems caused by tendency of the car to displace when the park brake is opened. Embodiments are presented, inter alia, wherein the problems are eliminated in a simple, effective and accurately controllable manner. Embodiments are presented, inter alia, wherein a new brake is utilized, in which brake controlling of back and forth movement of the compression members, as well as controlling of compression force of the compression members are effective and accurately controllable.

It is brought forward a new method for controlling movement of an elevator car, wherein the elevator comprises an elevator car arranged to travel vertically in a hoistway along at least one guide rail, and a suspension roping for suspending the car during its travel in the hoistway, the elevator car comprising an openable door in a doorway leading to the inside space of the elevator car and a park brake for holding the elevator car immovable at a landing, which park brake is mounted on the car, in particular on the frame of the car. The method comprises driving the elevator car, which is particularly suspended by a roping, vertically to a landing; and activating at least one brake mounted on the car; and holding the car immovable at the landing by means of the at least one brake mounted on the car, said holding comprising compressing at least one guide rail by compression members of the at least one brake with a first compression force; and opening a door for allowing loading and/or unloading the elevator car; and maintaining a door open for allowing loading and/or unloading the elevator car while the car is held immovable; and thereafter starting closing movement of said door. The method comprises after said starting closing movement of said door: relieving the at least one brake for allowing the elevator car to start to move vertically, said relieving comprising reducing the compression force of the at least one brake, to be smaller than said first compression force, such that the car starts to move vertically and the compression members start sliding vertically against the guide rail, in particular in a situation where forces pulling the car upwards and the forces pulling the car downwards, in particular gravity forces and rope tension force respectively, do not counteract each other completely, and maintaining compression with smaller compression force than said first compression force, allowing the compression members continue to slide vertically against the guide rail; and thereafter removing the compression. By said relieving and maintaining, the car is particularly made to slide into an equilibrium position where forces pulling the car upwards and the forces pulling the car downwards at least substantially completely counteract each other, the car resting suspended by the roping. In the method, the displacement of the car when the park brake is opened is not eliminated/prevented but instead, the displacement is allowed to happen while it is slowed down in such a way that despite a considerable displacement length no feel of a drop or a jump is experienced by the passenger when the park brakes are opened. With this solution one or more of the above mentioned objects can be achieved. Preferable, although not necessary, further details are introduced in the following, which further details can be combined with the method individually or in any combination.

In a preferred embodiment, said removing the compression is performed only if one or more predefined criteria are met. Hereby, it is possible to ensure the compression is applied until a desired state has been reached. In this way, premature removal of the compression can be avoided, for example, which is relevant for smoothness of movement experienced by the passengers, but also for safety.

In a preferred embodiment, the method comprises after starting of said relieving, detecting whether said one or more predefined criteria are met. The detecting can be performed based on data obtained by the elevator, for example by one or more sensors. The one or more sensor may include a sensor for sensing car movement, e.g. an acceleration sensor, and/or a sensor for sensing position of door of the elevator car, for example.

In a preferred embodiment, said one or more predefined criteria include: the door of the elevator car is fully closed and/or the vertical movement of the car has stopped.

In a preferred embodiment, during the maintaining the compression force of the at least one brake is reduced further, particularly for thereby preventing the sliding from stopping when the car approaches its equilibrium position due to the progress in movement, and for prolonging it to continue until the car is at least substantially in its equilibrium position where forces pulling the car upwards and the forces pulling the car downwards at least substantially completely counteract each other.

In a preferred embodiment, in said reducing the compression force of the at least one brake is reduced steplessly or stepwise.

In a preferred embodiment, in the method the compression force is reduced progressively such that it is at its smallest when the removing of the compression is performed.

In a preferred embodiment, the method comprises monitoring car movement, preferably by aid of at least one acceleration sensor mounted on the car, and the at least one brake is controlled based on car movement. Preferably, the elevator comprises at least one acceleration sensor mounted on the car, and said monitoring car movement comprises receiving signals from the at least one acceleration sensor, and said at least one brake is controlled based on signals received from said at least one acceleration sensor.

In a preferred embodiment, said at least one brake 6 is controlled based on car movement, and preferably particularly based on signals received from said at least one acceleration sensor such that any one, any two or all three of the following criteria is/are satisfied car movement speed does not exceed a predetermined threshold speed, and/or car acceleration does not exceed a predetermined threshold acceleration, and/or car deceleration does not exceed a predetermined threshold deceleration.

In a preferred embodiment, the park brake comprises compression members for compressing a guide rail between them; and moving means for moving the compression members relative to each other.

In a preferred embodiment, the moving means comprises a motor. The motor is preferably an electric motor. An electric motor is controllable such that it can be used as a power source controlling the compression force in said relieving and maintaining phases.

In a preferred embodiment, said moving means of the compression members comprise a screw jack operable to move, by screwing, the compression members towards each other, in particular to compress the guide rail between them, and away from each other, in particular for thereby relieving the compression. Thus, a forceful compression while at the same time a well controllable back and forth movement of the compression members can be provided. In particular, accurate adjustability of the force value is achieved.

In a preferred embodiment, said compressing at least one guide rail by compression members of the at least one brake is performed by pushing with a screw jack the compression members towards each other, and said reducing the compression force of the at least one brake is performed by pulling with the screw jack the compression members away from each other.

In a preferred embodiment, the moving means comprises an electric motor for operating the screw jack. The screw jack is then in the method operated with said electric motor.

In a preferred embodiment, said reducing is performed by reducing torque of the motor.

In a preferred embodiment, the reducing the compression force of the at least one brake is started already before the door of the elevator car is fully closed.

In a preferred embodiment, in said removing the compression, the compression members are brought out of contact with the guide rail.

In a preferred embodiment, in said maintaining compression is maintained with compression force, which is smaller than said first compression force, at least until the vertical movement of the car has stopped.

In a preferred embodiment, said screw jack comprises a first screwing member which is an externally threaded screwing member, preferably in the form of a externally threaded pin, and a second screwing member which is an internally threaded screwing member, preferably in the form of an internally threaded sleeve, surrounding said externally threaded first screwing member and being rotatable relative to it, the threads of the first and second screwing member forming counterparts for each other.

In a preferred embodiment, the motor is an electric servo motor.

In a preferred embodiment, the motor is an electric motor, and the torque thereof is adjustable to one or plurality of torque values between zero and full torque of the motor. Thus, magnitude of the compression force directed on the guide rail by the park brake can be adjusted to one or plurality of torque values between zero and full compression producible with the motor. When the moving means comprises a screw jack, the torque by which the motor rotates the screw jack is adjustable to one or plurality of torque values between zero and full torque of the motor. Said adjustability is preferably stepless, whereby the torque by which the motor rotates the screw jack is steplessly adjustable to torque values between zero and full torque of the motor. Thus, magnitude of the compression force directed on the guide rail by the park brake can be adjusted steplessly between zero and full compression producible with the motor. For the purpose of providing adjustable torque, the electric motor is preferably configured to have a torque controller for adjusting the torque of the motor. The motor is preferably a servo motor. A servo motor includes, typically in a compact manner, a torque controller for adjusting (e.g. steplessly) the torque of the motor integrated therein.

In a preferred embodiment, said first compression force is the maximal compression force of the brake. Hereby, standstill of the car can be ensured during said holding regardless of changes in load state of the elevator car.

In a preferred embodiment, during said maintaining compression the motor operates the screw press with torque that is between zero and full torque of the motor.

In a preferred embodiment, during said holding the motor operates the screw press with full torque, whereby said first compression force is the maximal compression force of the brake.

In a preferred embodiment, the brake comprises a force sensor for sensing compression force of the brake, in particular for sensing force by which the compression member is pressed against the guide rail, and the at least one brake is controlled based on compression force of the brake, in particular force by which the compression member is pressed against the guide rail. Preferably, the force sensor is connected with the torque controller of the motor, and the torque controller is configured to adjust the torque of the motor based on signal received from the force sensor.

In a preferred embodiment, distance between the highermost and lowermost landing is more than 100 meters. The presented solution is most useful in an elevator of this high lifting height.

In a preferred embodiment, the brake is a floating caliper brake.

In a preferred embodiment, said moving means and said compression members are mounted on a common brake caliper. The brake caliper on the other hand is preferably mounted on a brake carrier mounted immovably on the frame of the car.

In a preferred embodiment, only one of the compression members is acted on by the screw jack to move it relative to the brake caliper. This can be implemented by making the brake a floating caliper brake. The other one of the compression members is preferably at least substantially immovably attached on the brake caliper.

In a preferred embodiment, the brake comprises a brake carrier mounted immovably on the frame of the car, and the brake caliper is a floating brake caliper horizontally movably mounted on the brake carrier.

In a preferred embodiment, the brake comprises a returning spring between the caliper and the aforementioned brake carrier, which spring is arranged to urge the caliper to return to an initial position if displaced from the initial position. This makes it possible to control position of the compression members when not in contact with a guide rail. Preferably, the returning spring between the brake caliper and the brake carrier is arranged to be elastically deformed when the brake caliper is displaced horizontally from an initial position, and when elastically deformed due to said displacement, exert a force on the floating caliper urging it to return to said initial position. Thus, when the screw jack withdraws one of the compression members out of contact with the guide rail, returning spring is freed to return the caliper to the initial position and also to move the other compression member out of contact with the guide rail.

In a preferred embodiment, the returning spring comprises a plate elastically deformable by bending around an axis. Thus, the returning function is provided with a very simple structure, which is easy to manufacture, easy to adjust if desired and compact in size. The axis preferably extends parallel with a planar face of the plate whereby the bending direction enables large range of motion and well controllable deformation. Preferably, the plate comprises a first end of the plate mounted immovably on the brake carrier, and a second end placed in horizontal direction beside a detent face of a detent part fixedly connected with the caliper, such as with an integral part thereof or a detent part fixed immovably thereto, such that the detent face of a detent part displaces said second end of the plate horizontally when displaced horizontally from said initial position, making the plate to bend around an axis.

In a preferred embodiment, the position of the aforementioned plate is adjustable in horizontal direction. The plate then preferably comprises a first end mounted immovably on the brake carrier, preferably by an adjustable fastening means. Adjustability provides control of the position of the caliper and the compression members when not in contact with a guide rail. The aforementioned adjustable fastening means preferably comprise a bolt elongated in horizontal direction and mounted on the brake carrier, and said plate is fastened on the bolt at a position, which can be adjusted by moving the plate along the bolt.

In a preferred embodiment, the aforementioned plate is arranged to bend into arc-shape when bent. Preferably, the plate is straight when in rest state, i.e. when not bent.

In a preferred embodiment, one of the compression members is at least substantially immovable relative to the brake caliper, and when the brake caliper is in said initial position, said compression member that is at least substantially immovable relative to the brake caliper is out of contact from the guide rail. This provides that only one of the compression members needs to be acted on by the screw jack to move it relative to the brake caliper.

In a preferred embodiment, the screw jack is arranged to press one of the compression members, in particular in stroke direction of the screw jack, towards the other of the compression members, when the screwing members are rotated relative to each other in one direction, and to pull back said one of the compression members, in particular in stroke direction of the screw jack, away from the other of the compression members, when the screwing members are rotated relative to each other in the other direction.

In a preferred embodiment, the first screwing member is mounted rotatably but immovably in stroke direction of the screw jack relative to the brake caliper, and the second screwing member is mounted unrotatably and movably relative to the caliper in stroke direction of the screw jack. The stroke direction is preferably horizontal. The stroke direction is the axial direction of the pin when the screwing members comprise an externally threaded pin.

In a preferred embodiment, said screw jack comprises a guide member mounted immovably relative to the brake caliper, the second screwing member being movable relative to the caliper in stroke direction of the screw jack guided by the guide member.

In a preferred embodiment, the guide member comprises a nest wherein the second screwing member is at least partially accommodated and wherein it is movable relative to the brake caliper in stroke direction of the screw jack guided by the walls of the nest.

In a preferred embodiment, the aforementioned internally threaded second screwing member consists of plurality of sleeve parts connected to each other forming a single unit moving together. Said plurality of parts preferably comprise a first sleeve part and a second sleeve part, said first sleeve part accommodating the second sleeve part, the first sleeve part being provided with the internal threads of the second screwing member, and the second sleeve part being without internal threads. Thus, they are simple to manufacture and repair. The outer surface of the second sleeve part is preferably placed against a guide surface of a guide member for guiding movement of the second screwing member relative to the caliper in stroke direction of the screw jack. The guide surface of a guide member is preferably formed by walls of a nest at least partially accommodating the second screwing member.

In a preferred embodiment, the first and second screwing member are rotatable by the motor relative to each other for operating the screw jack, and in particular for thereby producing movement between them in stroke direction of the screw jack. The stroke direction is the axial direction of the pin when the screwing members comprise an externally threaded pin.

In a preferred embodiment, the motor is arranged to rotate in its first rotation direction for operating the screw jack such that is moves the compression members towards each other, and in its second rotation direction for operating the screw jack such that it moves the compression members away from each other.

In a preferred embodiment, the second screwing member is attached on a compression member.

In a preferred embodiment, said motor is preferably such that it comprises an output shaft connected (directly or indirectly via a transmission) with the rotatable screw member of the screw jack for rotating it relative to the other screwing member.

In a preferred embodiment, for enabling pushing and pulling of the compression member by the screw jack, the second screwing member is attached on a compression member.

In a preferred embodiment, said compression members are friction pads for frictionally engaging with the guide rail.

In a preferred embodiment, said compression members are movable relative to the car only in horizontal direction towards and away from the guide rail.

Thus, they are efficient in production of the compression, structurally simple and simple to control.

In a preferred embodiment, said compression members comprise at least a first compression member and second compression member which are disposed on opposite sides of a flange of a guide rail, which flange is elongated and oriented in vertical direction, said compression members thereby being placed for traveling on opposite sides of the flange and to engage opposite sides of the flange when the brake is activated.

In a preferred embodiment, said guide rail is a guide rail for guiding movement of the elevator car. For this purpose, the car can be provided with a guide device movable along the guide rail and comprising one or more guide rollers or guide sliders mounted on the car.

It is also brought forward an elevator configured to perform the aforementioned method for controlling movement of an elevator car. The elevator comprises an elevator car arranged to travel vertically in a hoistway along at least one guide rail, and a suspension roping for suspending the car during its travel in the hoistway, the elevator car comprising an openable door in a doorway leading to the inside space of the elevator car and a park brake for holding the elevator car immovable at a landing, which park brake is mounted on the car, in particular on the frame of the car. The elevator is configured to drive the elevator car, which is particularly suspended by a roping, vertically to a landing; and to activate at least one brake mounted on the car; and to hold the car immovable at the landing by means of the at least one brake mounted on the car, said holding comprising compressing at least one guide rail by compression members of the at least one brake with a first compression force. The elevator is moreover configured to open a door for allowing loading and/or unloading the elevator car; and to maintaining a door open for allowing loading and/or unloading the elevator car while the car is held immovable; and thereafter to start closing movement of said door. The elevator is configured, after said starting closing movement of said door to relieve the at least one brake for allowing the elevator car to start to move vertically, said relieving comprising reducing the compression force of the at least one brake, to be smaller than said first compression force, such that the car starts to move vertically and the compression members start sliding vertically against the guide rail, in particular in a situation where forces pulling the car upwards and the forces pulling the car downwards, in particular gravity forces and rope tension force respectively, do not counteract each other completely, and to maintain compression with smaller compression force than said first compression force, allowing the compression members continue to slide vertically against the guide rail; and thereafter to remove the compression. With this solution one or more of the above mentioned objects can be achieved. Preferable, although not necessary, further features, and steps which the elevator is configured to perform, are introduced in the above and in the following, which further features, and steps can be combined with the elevator individually or in any combination.

The elevator is preferably such that the car thereof is vertically movable and configured to serve two or more vertically displaced landings. The elevator is furthermore preferably configured to control movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

DETAILED DESCRIPTION

Figure 1:
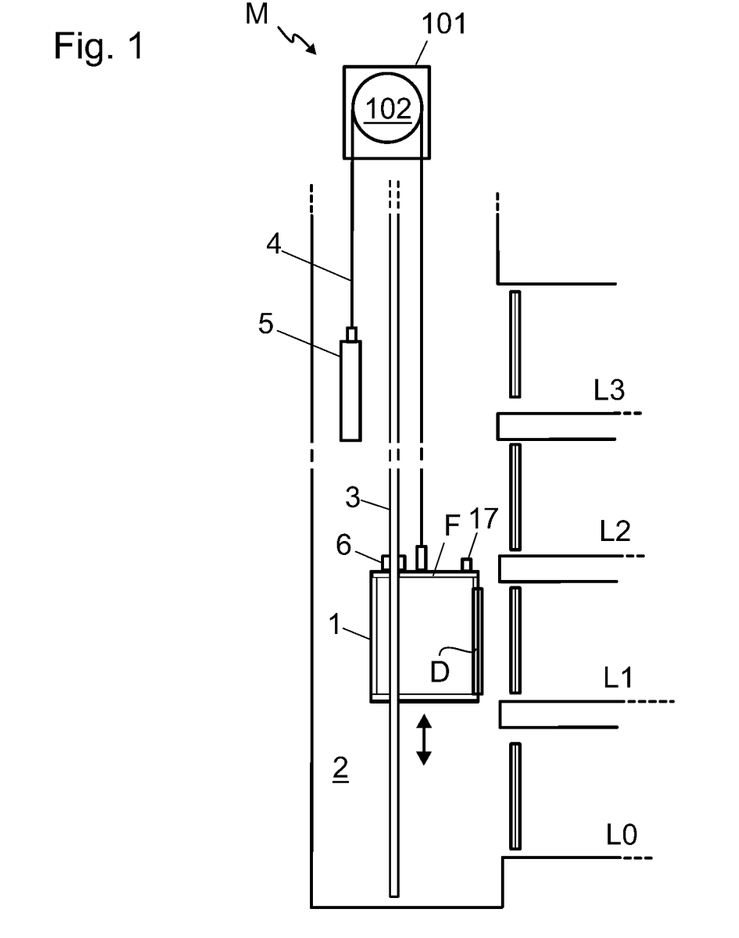
FIG. 1 illustrates an embodiment of an elevator according to the invention.

FIG. 1 illustrates an elevator comprising an elevator car 1 arranged to travel vertically in a hoistway 2 along at least one guide rail 3, and a suspension roping 4 for suspending the car 1 during its motor-driven travel in the hoistway 2. The elevator car 1 comprises a door D in a doorway leading to the inside space of the elevator car 1, whereby the elevator car 1 can be loaded and/or unloaded through said doorway.

The elevator comprises plurality of vertically displaced landings L0-L3.

The elevator car 1 can be driven to be positioned at any of said landings L0-L3 and parked there. The elevator comprises a park brake 6 for holding the car 1 immovable at a landing L0-L3, the park brake 6 being mounted on the car, in particular on a frame F of the car 1, and comprising compression members 6a, 6b for compressing a guide rail 3 between them. With said park brake 6, the elevator car 1 can be kept immovable during its loading and unloading, such that displacement caused by load changes and rope elasticity are prevented during the process of loading and unloading. The elevator presented comprises also a counterweight 5, which is however optional. In the preferred embodiment, the roping 4 interconnects the car 1 and the counterweight.

Figure 2A:
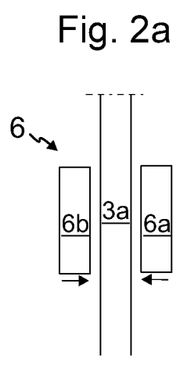
FIG. 2a illustrates compression members of the park brake when they are activated and move to compress a guide rail.

The elevator is arranged to implement a method for controlling movement of the elevator car 1. In the method, the elevator car 1 is driven vertically, while suspended by a roping 4, to a landing L0, L1, L2 or L3. Thereafter, in the method at least one brake 6 mounted on the car 1 is activated, FIG. 2a illustrates compression members of the park brake when they are activated and move to compress a guide rail. After said activation, the car 1 is held immovable at the landing L0, L1, L2 or L3 by means of the at least one brake 6 mounted on the car 1.

Figure 2B:
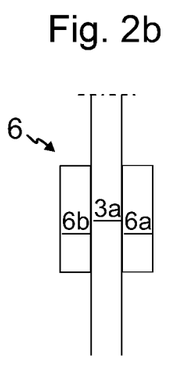
FIG. 2b illustrates compression members of the park brake when they compress a guide rail with first compression force holding the car immovable.

Said holding comprises compressing at least one guide rail 3 by the compression members 6a, 6b of the at least one brake 6 with a first compression force. Said first compression force is preferably the maximal compression force of the brake 6, whereby standstill can be ensured regardless of changes in load state of the elevator car 1. FIG. 2b illustrates this step, where the compression members of the park brake 6 compress a guide rail with first compression force holding the car immovable.

The method comprises, at a suitable moment opening said door D of the elevator car 1 for allowing loading and/or unloading the elevator car 1, i.e. moving of passengers and/or goods between the interior of the car 1 and the landing L0, L1, L2 or L3 in question. Opening of the door D can be started a moment before the car 1 stops at the landing L0, L1, L2 or L3, at the time the car 1 stops at the landing L0, L1, L2 or L3 after it.

In the method, the door D is maintained open for allowing loading and/or unloading the elevator car 1 while the car 1 is held immovable. After this, the method comprises starting closing movement of said door D.

Figure 2C:
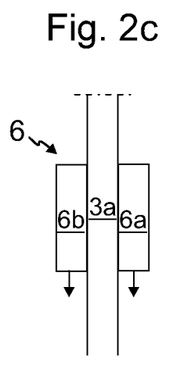
FIG. 2c illustrates compression members of the park brake when they compress a guide rail with compression force smaller than said first compression force, the compression members sliding vertically against the guide rail.

After said starting closing movement of said door D, in the method the at least one brake 6 is relieved for allowing the elevator car 1 to start to move vertically, said relieving comprising reducing the compression force of the at least one brake 6 to be smaller than said first compression force, such that the car 1 starts to move vertically and the compression members 6a, 6b start sliding vertically against the guide rail 3 in a situation where forces pulling the car upwards and the forces pulling the car downwards, namely gravity forces and rope tension force respectively, do not counteract each other completely. FIG. 2c illustrates this step, where compression members of the park brake compress a guide rail 3 with a compression force smaller than said first compression force, the compression members sliding vertically against the guide rail.

After this step, compression with smaller compression force than said first compression force is maintained, allowing the compression members 6a, 6b continue to slide vertically against the guide rail 3. After said maintaining which allows the sliding to continue, the compression is removed.

In the method, the car is made to slide into an equilibrium position where forces pulling the car upwards and the forces pulling the car downwards at least substantially completely counteract each other, the car resting suspended by the roping 4. There can be one or more criteria, which need to be realized before said removing the compression, which are preferably indicate that the aforementioned equilibrium state is reached.

It is preferable that in the method, the aforementioned reducing the compression force of the at least one brake 6 is started already before the door D of the elevator car 1 is fully closed. Hereby, sliding of the car 1 to an equilibrium position where upwards and downwards pulling forces counteract each other at least substantially completely can start already before the door D is closed. Concurrent operation of these two steps provides that time needed for the car 1 to start its journey from the landing can be saved.

Figure 2D:
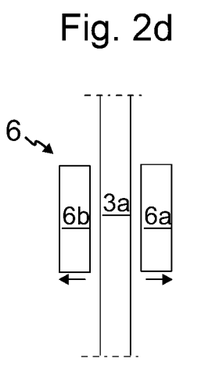
FIG. 2d illustrates compression members of the park brake when the compression is removed by moving the out of contact with a guide rail.

In said removing the compression, the compression members 6a,6b are brought out of contact with the guide rail 3. FIG. 2d illustrates compression members of the park brake when the compression is removed by moving the out of contact with a guide rail.

In the preferred embodiment, said removing the compression is performed only if one or more predefined criteria are met. For this purpose, the method comprises after starting of said relieving, detecting whether said one or more predefined criteria are met. Said one or more predefined criteria preferably include: the door D of the elevator car 1 is fully closed and/or the vertical movement of the car 1 occurring due to the sliding of the compression members 6a, 6b against the guide rail 3 has stopped.

In said reducing the compression force of the at least one brake 6 can be reduced steplessly or stepwise to be smaller than said first compression force. During the maintaining the compression force of the at least one brake 6 can be reduced further to be even smaller, e.g. steplessly or stepwise with one or more steps. The further reduction of the compression force provides that when the car 1 approaches its equilibrium position due to the progress in movement, the sliding does not stop but is prolonged to continue until the car 1 is at least substantially at its equilibrium position. Otherwise, compression produced by the park brake 6 might be able to stop the movement relatively far from the equilibrium position, which would mean that a drop or jump would take place when the compression finally is removed. Generally, it is preferable that in the method, the compression force is reduced progressively, e.g. steplessly or stepwise, such that it is at its smallest when the removing of the compression is performed. This way elimination of said drop or jump can be facilitated.

Although the maintenance phase may include further reduction of the compression force, in some elevators it may be advantageous during the maintaining the compression force of the at least one brake, to slightly increase said compression force before said further reduction, such as right after the sliding has started. This, provides that a jerk caused by change from static friction state to kinetic friction state can be reduced.

It is preferred that in said maintaining, compression is maintained with compression force, which is smaller than said first compression force, at least until the vertical movement of the car 1 due to the sliding has stopped. As above mentioned, in said maintaining, the force can but need not be maintained constant. As mentioned, the method can involve further reduction of the compression force, which may be advantageous for reaching of the equilibrium state.

FIGS. 3-6 illustrate an embodiment of the park brake 6. The park brake 6 comprises compression members 6a, 6b for compressing a guide rail 3 between them and a moving means 20, 9 for moving the compression members 6a, 6b relative to each other.

The moving means 9, 20 comprises a motor 9, preferably an electric motor. A motor, in particular an electric motor, can be made controllable such that it can be used as a power source for implementation of a brake the compression force of which can be controlled, and in particular reduced as described. In the method, said reducing can then be performed by reducing torque of the motor 9.

Said moving means 20, 9 comprise a screw jack 20 operable to move, by screwing, the compression members 6a, 6b towards each other to compress the guide rail 3 between them, and away from each other for thereby relieving the compression.

In the preferred embodiment presented, said moving means 9, 20 of the compression members 6a, 6b comprise a screw jack 20 operable to move by screwing, the compression members 6a, 6b towards each other to compress the guide rail 3 between them, and away from each other for thereby relieving the compression. Thus, a forceful compression while at the same time a well controllable back and forth movement of the compression members 6a,6b can be provided. In particular, accurate adjustability of the force value is achieved.

The method is then implemented such that said compressing at least one guide rail by compression members of the at least one brake 6 is performed by pushing with a screw jack 20 the compression members 6a,6b towards each other.

Said reducing the compression force of the at least one brake is performed by pulling with the screw jack the compression members 6a, 6b away from each other. The screw jack 20 is operated with an electric motor 9.

It is preferable that the method comprises monitoring car movement, preferably by aid of at least one acceleration sensor 17 mounted on the car 1, and the at least one brake 6 is controlled based on car movement. This is preferably implemented such that the elevator comprises at least one acceleration sensor 17 mounted on the car 1, and said monitoring car movement comprises receiving signals from the at least one acceleration sensor 17, and said at least one brake 6 is controlled based on signals received from said at least one acceleration sensor 17. Car movement can of course alternatively be monitored by other means. In addition or as an alternative to car movement, there can be other variables and parameters based on which the brake 6 can be controlled, such as a measured magnitude of force by which the compression member is pressed against the guide rail.

Control of the at least one brake 6 based on car movement provides that the sliding can be detected and the sliding can be controlled based on feedback. In practice, the relieving step can be implemented such that the compression force is reduced, e.g. by aid of a servo motor, until, by aid of the acceleration sensor 17 predetermined car movement indicating sliding is detected, and then the reduction of compression is stopped (the servo motor 9 stops).

For the purpose of making the sliding smooth, the aforementioned control of said at least one brake 6 based on car movement is preferably implemented such that any one, any two or all three of the following criteria is/are satisfied
car movement speed does not exceed a predetermined threshold speed, and/or
car acceleration does not exceed a predetermined threshold acceleration, and/or
car deceleration does not exceed a predetermined threshold deceleration.

These criteria related to car movement facilitate each that the sliding process, such as the starting of the sliding, changes in speed of sliding or the ending thereof, is not felt by the passengers inside the elevator car 1.

In the preferred embodiment illustrated in FIGS. 3-6, the park brake is a floating caliper brake comprising a brake caliper 10 movable in horizontal direction. The brake being of this kind, only one 6b of the compression members 6a,6b needs to be directly actuatable by the screw jack, as it is the case in the illustrated embodiments. There only one of the compression members 6a, 6b is directly acted on by the screw jack to move it relative to the brake caliper. The other is at least substantially immovably attached on the brake caliper 11. The moving means 9, 20 and said compression members 6a, 6b are mounted on a common brake caliper 10. The brake caliper 10 is mounted movably in horizontal direction on a brake carrier 11, which is mounted immovably on the frame F of the elevator car 1.

In the preferred embodiment illustrated in FIGS. 3-6, the brake 6 comprises a returning spring 13 between the brake caliper 10 and the brake carrier 11 arranged to urge the caliper 10 to return to an initial position if displaced from the initial position. The initial position is thereby the position where the caliper is when the brake is not in braking state and the screwing members are out of contact of the guide rail 3. The returning spring 13 between the caliper 10 and the brake carrier 11 is arranged to be elastically deformed when the caliper 10 is displaced horizontally from an initial position, and when elastically deformed exert a force on the floating caliper 10 urging it to return to said initial position. The returning spring is implemented in the preferred embodiment such that the spring 13 comprises a plate 13 elastically deformable by bending around an axis 13b extending parallel with a planar face 13a of the plate. The position of the axis 13b is determined by structure of the plate, and it can be also different from what is shown. In the preferred embodiment, the plate 13 is arc-shaped when bent. Preferably, the plate 13 is straight when in rest state, i.e. when not bent.

The position of the plate 13 is preferably adjustable in horizontal direction. The plate 13 comprises a first end mounted immovably on the brake carrier 11, preferably by adjustable fastening means 13c,13d. The plate 13 comprises a second end placed in horizontal direction beside a detent face 16a of a detent part 16 fixedly connected with the caliper 10, such that the detent part 16 displaces said second end of the plate horizontally when the caliper 10 is displaced horizontally from said initial position, causing the plate 13 to bend around axis 13b. The detent part 16 can be an integral part of the caliper 10 or a detent part fixed immovably thereto.

The aforementioned adjustable fastening means 13c,13d preferably comprise a bolt 13d elongated in horizontal direction and mounted on the brake carrier 11, and said plate 13 is fastened on the bolt 13d at a position, which can be adjusted (in horizontal direction, see arrow in FIG. 4) by moving the plate 13 along the bolt 13d. The adjustable fastening means 13c,13d comprise a tightening means for tightening the plate immovably on the bolt 13d, which in the presented embodiment comprise two nuts between which the plate 13 is clamped.

When the caliper is in said initial position the compression member 6a not directly actuatable by the screw jack 20, is apart (out of contact) from the guide rail 3. Width of the gap that is between the directly actuatable compression member 6b and the guide rail 3 can be controlled by the moving means.

The preferred details of the screw jack 20 are described hereinafter. Said screw jack 20 comprises a first screwing member 7 which is an externally threaded screwing member 7, and a second screwing member 8 which is an internally threaded screwing member 8 surrounding said first screwing member 7 and rotatable relative to it, the threads of the first and second screwing member 7, 8, forming counterparts for each other.

The screw jack 20 is arranged to press one 6b of the compression members in stroke direction S thereof towards the other 6a of the compression members, when the screwing members 7, 8 are rotated relative to each other in one direction, and to pull said one of the compression members in stroke direction thereof away from the other of the compression members, when the screwing members are rotated relative to each other in the other direction. The first and second screwing member 7, 8 are rotatable by the motor 9 relative to each other for operating the screw jack 20, and in particular for thereby to producing movement between them in stroke direction S of the screw jack 20.

In the preferred embodiment illustrated in FIGS. 3-6, the first screwing member 7 is an externally threaded screwing member 7 in the form of an externally threaded pin, and the second screwing member 8 is an internally threaded screwing member 8 in the form of a internally threaded sleeve. The stroke direction S of the screw jack is the direction of the central axis of the externally threaded pin. The internally threaded sleeve 8 consists of plurality of parts 8a,8b connected to each other forming a unit moving together, but it could be designed to consist of one part only, in which case the parts 8a, 8b would be integrated. Said plurality of parts preferably comprise a first sleeve part 8a and a second sleeve part 8b, said first sleeve part 8a accommodating the second sleeve part 8b, the first sleeve part 8a being provided with the internal threads of the sleeve 8, and the second sleeve part being without internal threads. Thus, they are simple to manufacture and repair. The outer surface of the second sleeve part 8b is preferably placed against a guide surface of a guide member 12, as will be described later below. The Figures illustrate the stroke direction S, which is coincident with the central axis of the externally threaded pin.

The first screwing member 7 is mounted on the caliper 10 rotatably relative to the to the caliper 10, but immovably in stroke direction S of the screw jack 20 relative to the to the caliper 10, and the second screwing member 8 is mounted on the caliper 10 unrotatably relative to the to the caliper 10 and movably relative to the caliper 10 in stroke direction S of the screw jack 20. The stroke direction S is in the FIGS. 3-6 the axial direction of the aforementioned externally threaded pin. The externally threaded member being rotatable by the motor facilitates rigidity of the guidance of the movable screwing member 8 by use of a nested structure for the guidance. Blocking of rotation of the second screwing member is thus also facilitated. The pin 7 can also be connected with simple design with the motor either directly or via transmission.

In the preferred embodiment of FIGS. 3-6, said screw jack 20 comprises a guide member 12 mounted on the caliper 10 immovably relative to the caliper 10, the second screwing member 8 being movable relative to the caliper 10 in stroke direction S of the screw jack 20 guided by the guide member 12. This feature is implemented most preferably, although not necessarily as alternatively other kind of guides can be used, with the presented structure wherein the guide member 12 comprises a nest 12a in which nest 12a the second screwing member 8 is at least partially accommodated and wherein it is movable relative to the caliper 10 in stroke direction S of the screw jack 20 guided by the walls of the nest 12a. The outer surface of the second screwing member 8, preferably a second sleeve part 8b thereof, is preferably placed against a guide surface of a guide member 12 formed by walls of the nest 12a.

The aforementioned motor 9 is preferably rotatable in two directions. The motor 9 is configured to rotate in its first direction for operating the screw jack 20 such that is moves the compression members 6a,6b towards each other, and in second direction for operating the screw jack 20 such that it moves the compression members away from each other.

For enabling pushing and pulling of the compression member 6b by the screw jack 20, the second screwing member 8 is attached on a compression member 6b. This can be implemented in numerous alternative ways, such as by bolt connection.

As mentioned, it is preferable that the park brake 6 presented in the preferred embodiment of FIGS. 3-6 is a floating caliper brake, where the brake caliper 10 is mounted movably in horizontal direction on a brake carrier 11, which is mounted immovably on the frame F of the elevator car 1. It is preferable, although not necessary, that said movability in horizontal direction is implemented such that the brake 6 comprises a horizontally oriented guide rod 11a, and the brake caliper 10 comprises a guide member 10a moveable along the guide rod 11a in horizontal direction for allowing horizontal movement of the floating brake caliper 10 when the brake is activated. The brake 6 can comprise one or more of said guide rods 11a and guide members 10a, as it is the case in the preferred embodiment and visible in FIG. 5, for instance.

Said compression members are preferably friction pads for frictionally engaging with the guide rail 3. Generally, it is preferable that said compression members 6a, 6b are movable relative to the caliper 10 only in horizontal direction towards and away from the guide rail 3. The caliper on the other hand is preferably immovably but in general at least substantially immovably mounted relative to the car via the brake carrier 11.

Generally, said compression members 6a, 6b are preferably of the kind that they comprise at least a first compression member 6a and second compression member 6b which are disposed on opposite sides of a flange 3a of a guide rail 3, which flange is elongated and oriented in vertical direction, said compression members 6a, 6b thereby being placed for traveling on opposite sides of the flange 3a and to engage opposite sides of the flange 3a when the brake 6 is activated.

As mentioned, the motor 9 is preferably an electric motor. Preferably, the torque by which the motor 9 rotates the screw jack 20 is adjustable to one or plurality of torque values between zero and full torque of the motor 9. Thus, magnitude of the compression force directed on the guide rail 3 by the park brake 6 can be adjusted to one or plurality of torque values between zero and full compression producible with the motor 9. In the method, said reducing is then performed by reducing torque of the motor 9.

Said adjustability is moreover preferably stepless, whereby the torque by which the motor rotates the screw jack 20 is steplessly adjustable to torque values between zero and full torque of the motor 9. Thus, magnitude of the compression force directed on the guide rail 3 by the park brake 6 can be adjusted steplessly to any force between zero and full compression force producible with the motor 9. This facilitates controllability of the progress of the relieving of the brake 6.

For the purpose of providing adjustable torque, the electric motor is preferably configured to have a torque controller for adjusting, steplessly or stepwise as mentioned, the torque of the motor 9. The motor 9 is preferably a servo motor, which includes in a compact manner a torque controller for adjusting the torque of the motor 9 integrated therein.

Said motor 9 is preferably such that it comprises an output shaft connected (directly or indirectly via a transmission) with the rotatable screw member 7 of the screw jack 20 for rotating it relative to the other screwing member 8.

Preferably, the brake 6 comprises a force sensor 21 for sensing compression force of the brake 6, in particular for sensing force by which the compression member is pressed against the guide rail 3, and the at least one brake 6 is controlled based on compression force of the brake 6, in particular force by which the compression member is pressed against the guide rail 3.

Figure 3:
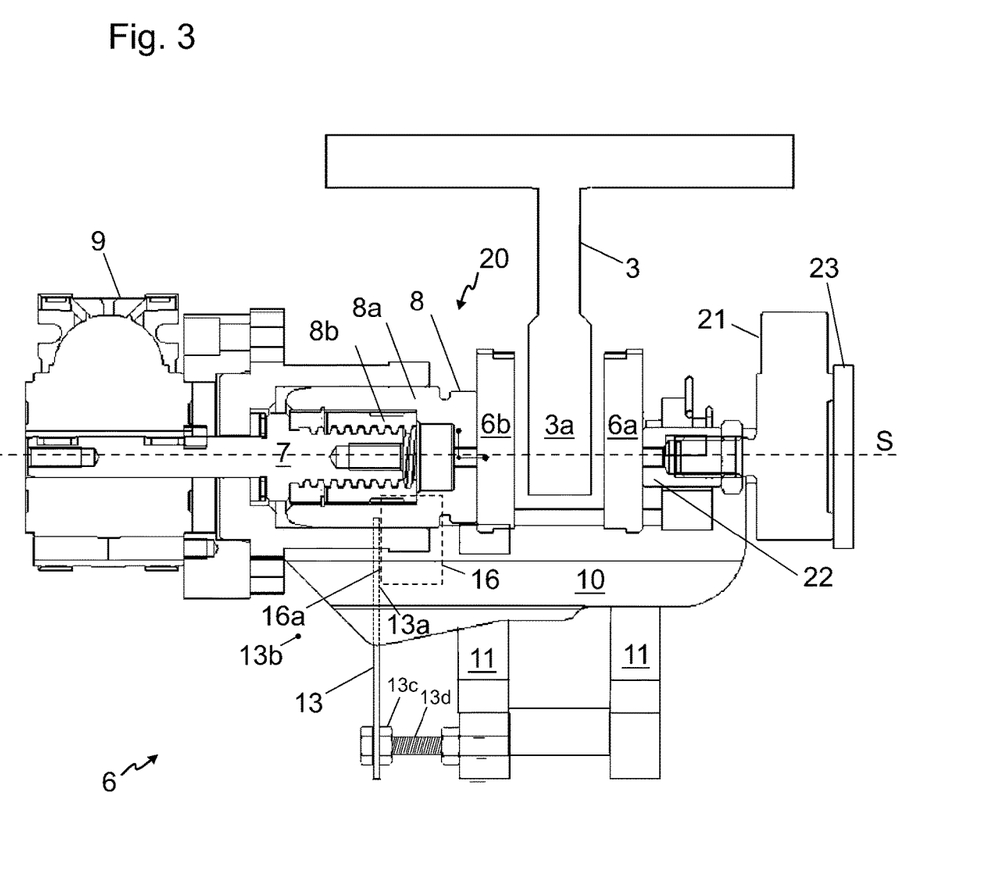
FIG. 3 illustrates a cross-section of a preferred embodiment of the park brake when not compressing a guide rail as viewed in vertical direction.
Figure 4:
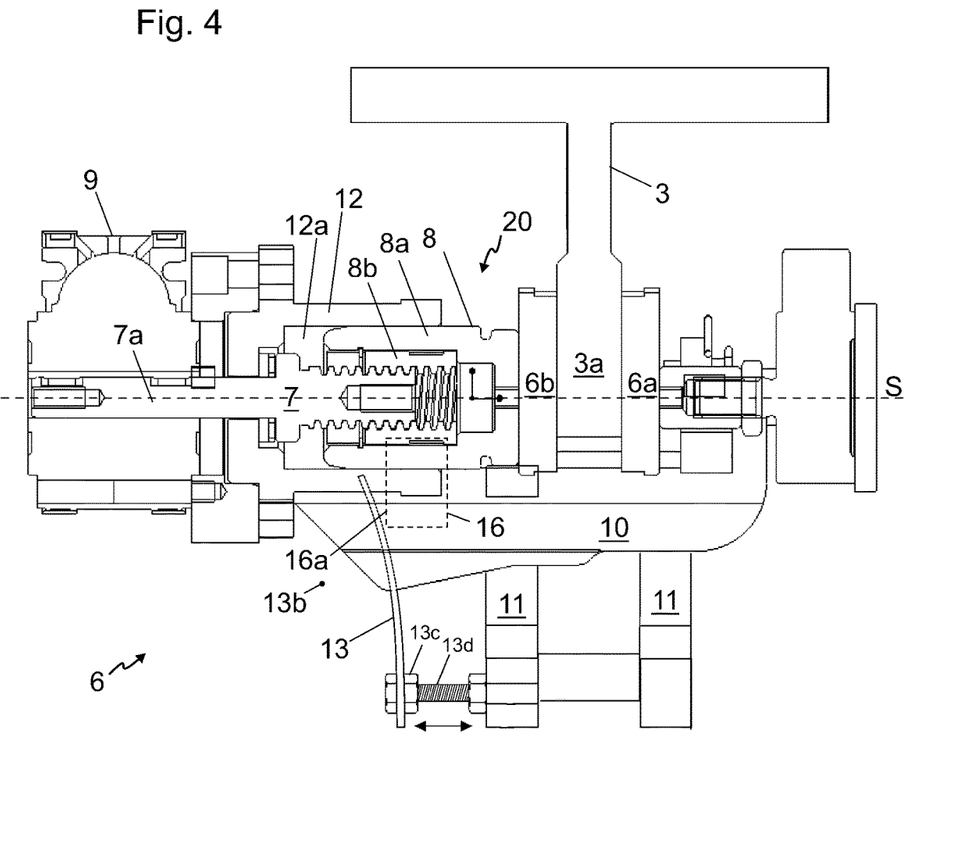
FIG. 4 illustrates a cross-section of a preferred embodiment of the park brake when compressing a guide rail as viewed in vertical direction.
Figure 5:
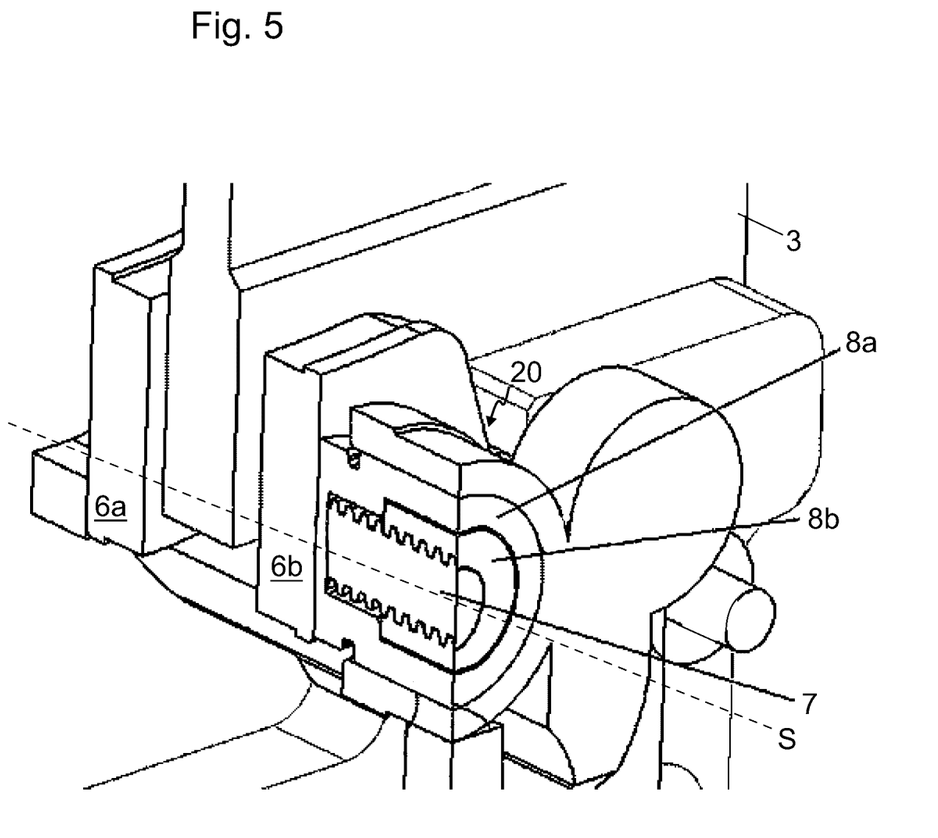
FIG. 5 illustrates a cross-section of a preferred embodiment of the park brake when not compressing a guide rail as viewed three dimensionally.
Figure 6:
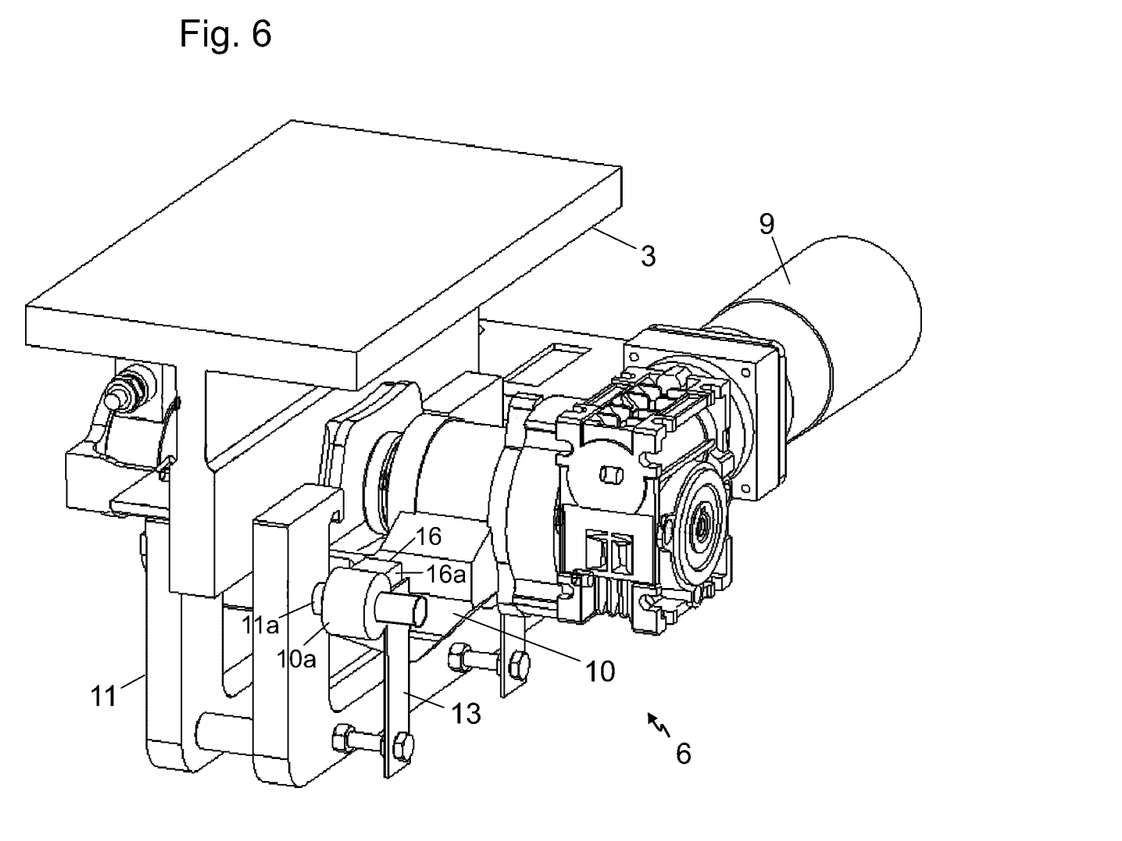
FIG. 6 illustrates a three dimensional overall view of a preferred embodiment of the park brake when not compressing a guide rail.

FIG. 3 illustrates a force sensor 21 for sensing compression force of the brake, in particular for sensing force by which one of the compression member 6a is pressed against the guide rail 3. This is a preferred, although not a necessary, feature.

The sensing of the compression force provides that the brake 6 can be controlled based on the actual force. However, sensing particularly the compression force is not necessary for controlling the brake such that a certain response in compression force, e.g. reduction of the force, can be achieved. Torque based control or car movement parameter based control, for example, enable control of the brake such that the force becomes reduced such that the sliding starts, for example.

The force sensor 21 is preferably connected with the torque controller of the motor 9, and the torque controller is configured to adjust the torque of the motor 9 based on signal received from the force sensor 21.

The force sensor 21 provides swift and simple feedback for the torque controller of the motor 9. The implementation is preferably such that the brake 6 comprises a force sensor 21 between the brake caliper 10 and one 6a of the compression members 6a, 6b for sensing compression force by which the compression member 6a is pressed against the guide rail 3. No substantial movement relative to the brake caliper 10 is needed but force has to transmit through the force sensor 21 so the load can be read. Hereby, when force sensing is to be implemented with the presented particular solution, the compression member 6a is preferably not completely rigidly fixed directly on the brake caliper 10. In the embodiment presented in FIG. 3, the compression member 6a is fixed on a part 22 of the force sensor 21, which force sensor 21 is fixed on the brake caliper 10 by a connection part 23. The connection part 23 can be one attached on the brake caliper 10 or alternatively the connection part 23 can be integral with the brake caliper 10.

For the purpose of moving the car 1, the elevator can comprise suitable machinery M, said machinery M preferably comprising a rope wheel 102 around which the roping 4 passes which rope wheel 102 is a motor-driven rope wheel 102 connected with a motor 101. FIG. 1 illustrates the suspension and drive function of the elevator in a simplified manner. For example, the elevator could comprise more rope wheels than presented.

The presented solution is most useful in a high lifting height elevator. The elevator is preferably such that the distance between the highermost and lowermost landing L0,L3 where the car can park is more than 100 meters.

In the above, several preferred features and details of the elevator has been described. The preferred features and details are to be understood as being advantageous, however optional, as their presence may not be necessary.

As mentioned, it is preferred that the returning spring comprises a plate elastically deformable by bending around an axis. However, this is not necessary as alternatively some other form of spring can be utilized. The spring could then be a coil spring or some other elastically deformable member, for example.

As mentioned, it is preferred that the motor is a servo motor. However, this is not necessary as alternatively, some other form of motor can be utilized. The motor could then be a step motor, for example.

As mentioned, control of the at least one brake 6 based on car movement provides that the sliding can be detected and the sliding can be controlled based on feedback. However, this is not necessary. Alternatively, for example a so called sliding factor can be predefined for the system so that the compression force of the park brake 6 can be controlled based on the mass inside the car and the factor. This system can then work for example such that that the park brake grips with maximal compression force (with full torque of the motor) when the car enters the level. Then passengers exit and/or enter the car 1. When the doors starts to close, the elevator calculates the mass inside the car and multiplies it with the preset sliding factor. The sliding factor can be a factor defined so that the car always slides with set force.

As mentioned above, there can be alternative variables and parameters based on which the brake 6 can be controlled individually or in parallel, such as a measured magnitude of force by which the compression member is pressed against the guide rail and/or the car movement. An additional alternative is to control the brake 6 based on rope force of the roping 4. This can be implemented for example such that when the mass inside the elevator is transferred on the suspension ropes by sliding the car 1 slowly, the compression can be removed.

In the application, preferred structural details for the brake 6 have been presented. However, this particular structure is not necessary, because in implementation of the method also a different brake may be used.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for controlling movement of an elevator car in an elevator, wherein the elevator comprises the elevator car arranged to travel vertically in a hoistway along at least one guide rail, and a suspension roping for suspending the car during travel thereof in the hoistway, the elevator car comprising an openable door in a doorway leading to an inside space of the elevator car, and a park brake for holding the elevator car immovable at a landing, the park brake being mounted on the elevator car, the method comprising:
   driving the elevator car vertically to a landing;
   activating the park brake mounted on the car;
   holding the car immovable at the landing with the park brake mounted on the elevator car, said holding comprising compressing at least one guide rail by compression members of the park brake with a compression force having a first value;
   opening a door for allowing loading and/or unloading of the elevator car;
   maintaining the door open for allowing loading and/or unloading of the elevator car while the car is held immovable;
   starting closing movement of said door; and
   after said starting closing movement of said door:
   relieving the park brake for allowing the elevator car to start to move vertically, said relieving comprising reducing the compression force of the park brake to be smaller than said first value, such that the compression members start sliding vertically against the guide rail;
   maintaining compression with the compression force having a value smaller than said first value, allowing the compression members to continue to slide vertically against the guide rail; and
   thereafter removing the compression force.

2. The method according to claim 1, wherein said removing the compression force is performed only if one or more predefined criteria are met.

3. The method according to claim 2, wherein said one or more predefined criteria include:
   the door of the elevator car is fully closed; and/or
   the vertical movement of the car has stopped.

4. The method according to claim 2, wherein during the maintaining, the compression force of the park brake is reduced further.

5. The method according to claim 1, wherein during the maintaining, the compression force of the park brake is reduced further.

6. The method according to claim 1, wherein the compression force is reduced progressively such that the value of the compression force is smallest when the removing of the compression force is performed.

7. The method according to claim 1, further comprising:
   monitoring car movement, by aid of at least one acceleration sensor mounted on the car; and
   the park brake is controlled based on the car movement.

8. The method according to claim 1, wherein said park brake is controlled based on car movement such that at least one of the following criteria is satisfied:
   car movement speed does not exceed a predetermined threshold speed;
   car acceleration does not exceed a predetermined threshold acceleration; and
   car deceleration does not exceed a predetermined threshold deceleration.

9. The method according to claim 1, wherein the park brake further comprises:
   a mover configured to move the compression members relative to each other.

10. The method according to claim 9, wherein the mover comprises a motor.

11. The method according to claim 10, wherein said mover comprises a screw jack operable to move, by screwing, the compression members towards each other, and away from each other.

12. The method according to claim 10, wherein said reducing the compression force of the park brake is performed by reducing torque of the motor.

13. The method according to claim 10, wherein the motor is an electric servo motor.

14. The method according to claim 11, wherein said screw jack comprises:
   a first externally threaded screwing member; and
   a second internally threaded screwing member, surrounding said first externally threaded screwing member and being rotatable thereto, threads of the first externally threaded screwing member and the second internally threaded screwing member forming counterparts for each other.

15. The method according to claim 11, wherein the motor is an electric motor, and the torque by which the motor rotates the screw jack is adjustable to one or a plurality of torque values between zero and full torque of the motor.

16. The method according to claim 1, wherein the reducing the compression force of the park brake is started already before the door of the elevator car is fully closed.

17. The method according to claim 1, wherein said maintaining compression is maintained with a compression force smaller than said first compression force, at least until the vertical movement of the elevator car has stopped.

18. The method according to claim 1, wherein said first value of the compression force is the maximal compression force of the park brake.

19. The method according to claim 1, wherein the park brake comprises a force sensor for sensing the compression force of the brake, and the park brake is controlled based on the compression force of the brake.

20. An elevator configured to perform the method defined in claim 1.

* * * * *